United States Patent [19]
Kino et al.

[11] Patent Number: 6,122,090
[45] Date of Patent: Sep. 19, 2000

[54] METHOD OF MICROMACHINING A SCANNING TORSION MIRROR

[75] Inventors: Gordon S. Kino, Stanford, Calif.; Pavel Neuzil, Singapore, Singapore

[73] Assignee: The Board of Trustees of the Leland Stanford Junior Univeristy, Palo Alto, Calif.

[21] Appl. No.: 09/438,098

[22] Filed: Nov. 10, 1999

Related U.S. Application Data

[62] Division of application No. 09/141,501, Aug. 28, 1998.
[60] Provisional application No. 60/062,675, Oct. 22, 1997.

[51] Int. Cl.$^7$ .................................................. G02B 26/08
[52] U.S. Cl. .......................... 359/224; 359/900; 359/223
[58] Field of Search ..................... 359/198, 199, 359/201, 202, 223, 224, 846, 848, 900; 216/41; 204/192.17, 192.26, 192.27, 192.37

[56] References Cited

U.S. PATENT DOCUMENTS

| | | | |
|---|---|---|---|
| 4,956,619 | 9/1990 | Hornbeck | 330/4.3 |
| 5,061,049 | 10/1991 | Hornbeck | 359/224 |
| 5,557,444 | 9/1996 | Melville et al. | 359/199 |
| 5,629,790 | 5/1997 | Neukermans et al. | 359/198 |
| 5,648,618 | 7/1997 | Neukermans et al. | 73/862.08 |
| 5,742,419 | 4/1998 | Dickensheets et al. | 359/201 |
| 5,872,880 | 2/1999 | Maynard | 385/88 |
| 5,907,425 | 5/1999 | Dickensheets et al. | 359/224 |

OTHER PUBLICATIONS

Petersen, K.E., "Silicon Torsional Scanning Mirror", *IBM J. Res. Develop.*, vol. 24, No. 5, Sept. 1980, pp. 631–637.
Allen et al., "Movable Micromachined Silicon Plates with Integrated Position Sensing", *Sensors and Actuators*, A21–A23 (1990), pp. 211–214 (No Month).
Jaecklin et al., "Line–addressable torsional micromirrors for light modulator arrays", *Sensors and Actuators*, A44 (1994), pp. 83–89 (No Month).
Mattsson, K.E. "Surface micromachined scanning mirrors", *Microelectronic Engineering* 19 (1992), pp. 199–204 (No Month).

*Primary Examiner*—James Phan
*Attorney, Agent, or Firm*—Flehr Hohbach Test Albritton & Herbert LLP

[57] ABSTRACT

A method of forming a silicon nitride scanning torsion mirror which includes depositing a silicon nitride layer on a support substrate, etching the silicon nitride layer to form a mirror supported within the layer by integral torsion hinges and then selectively etching the substrate under the mirror to form a well.

3 Claims, 5 Drawing Sheets

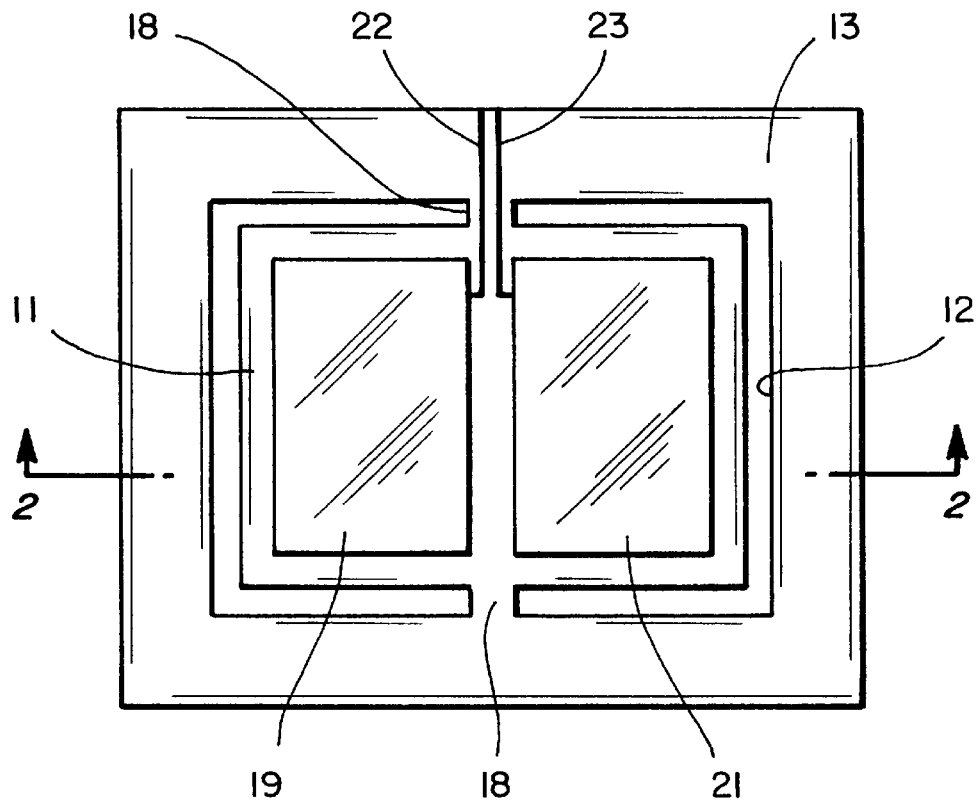
FIG_1
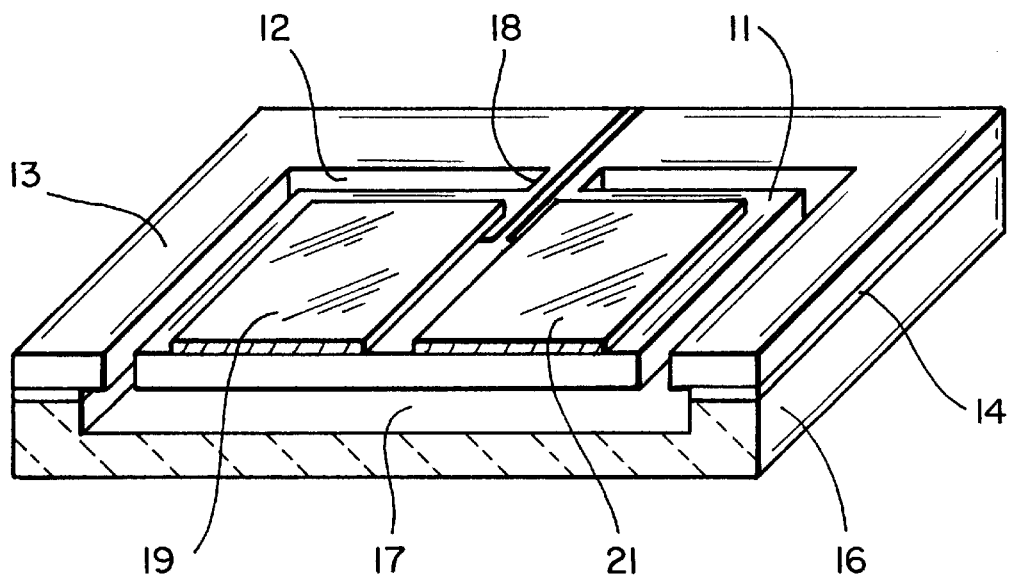
FIG_2

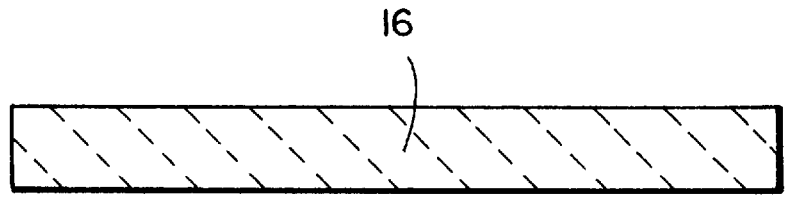
FIG_3A
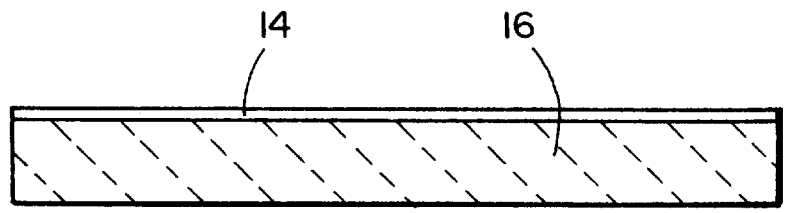
FIG_3B
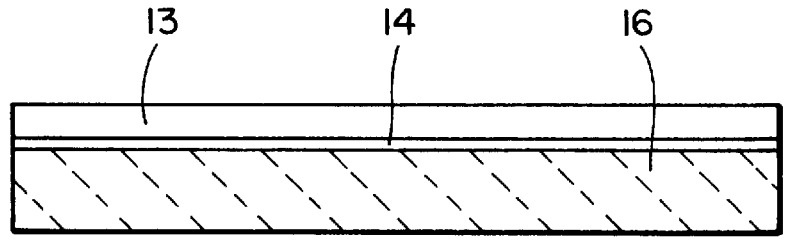
FIG_3C
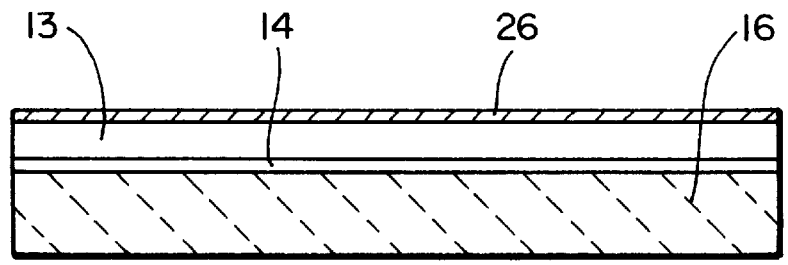
FIG_3D

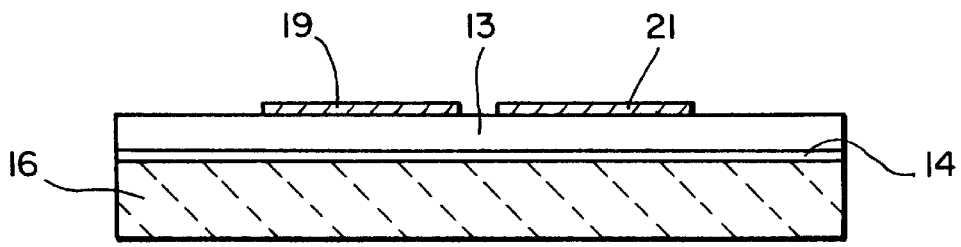
FIG_3E
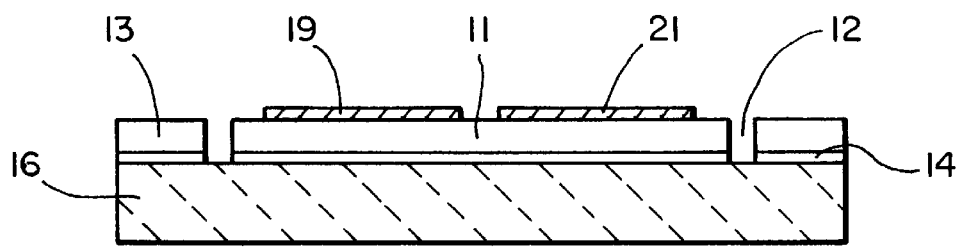
FIG_3F
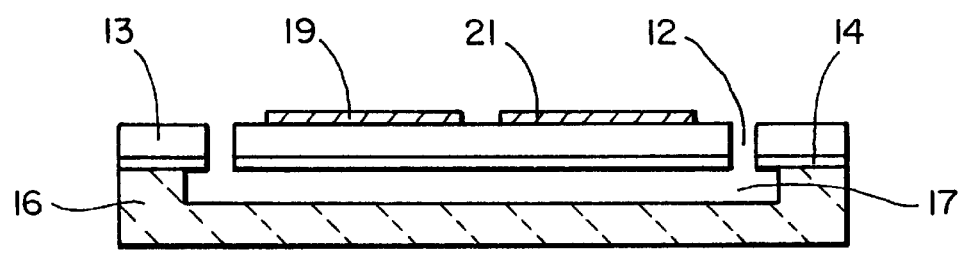
FIG_3G
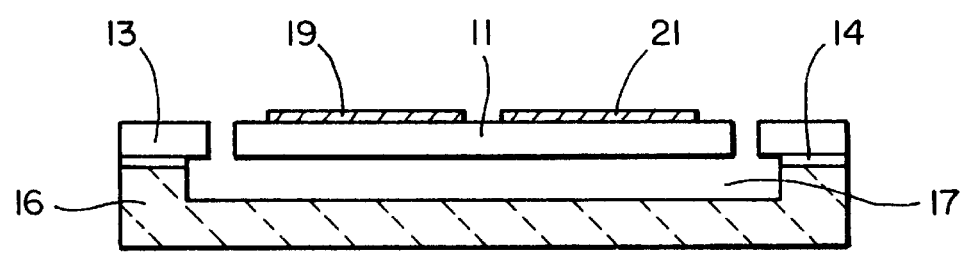
FIG_3H

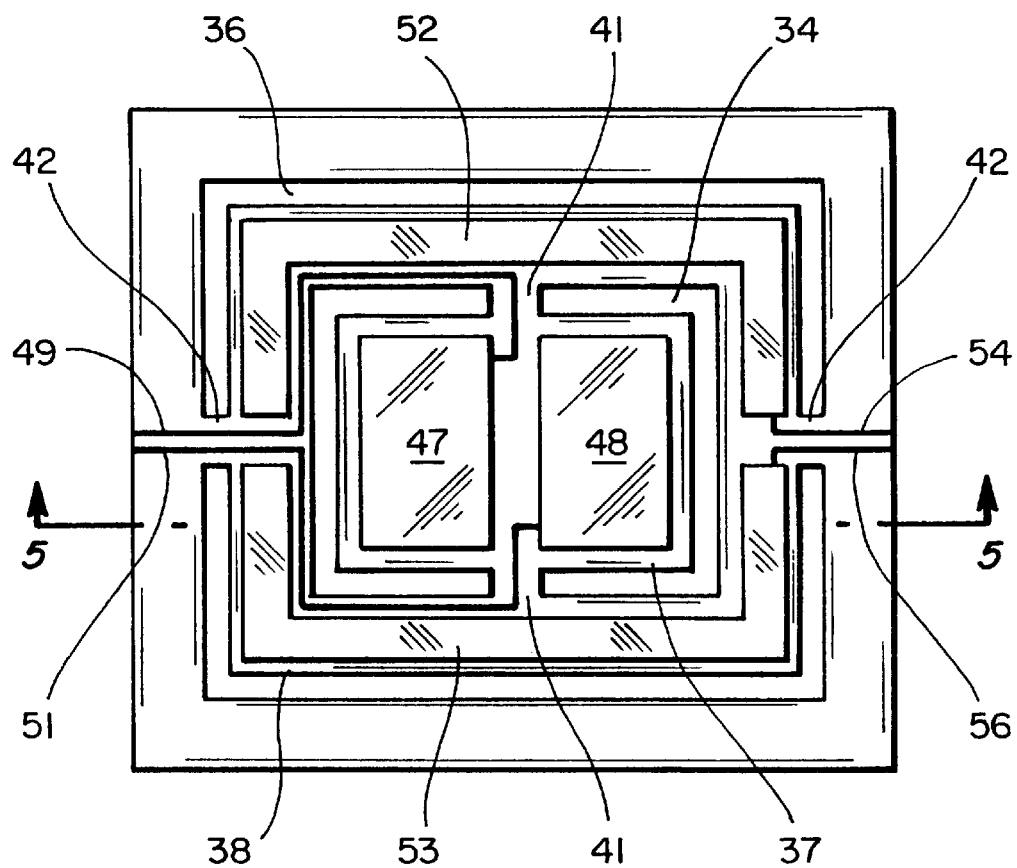
FIG_4
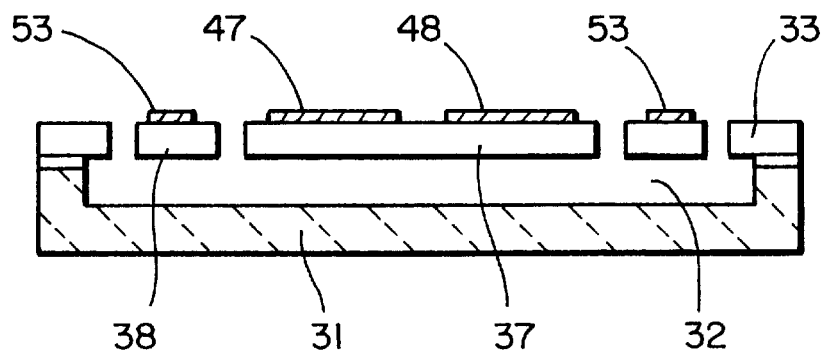
FIG_5

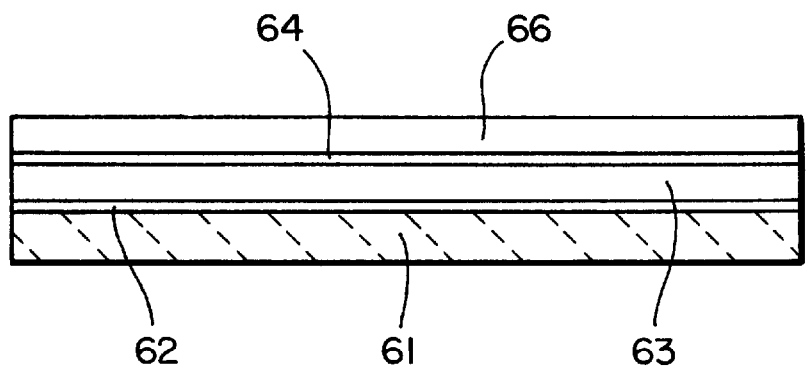
FIG_6A
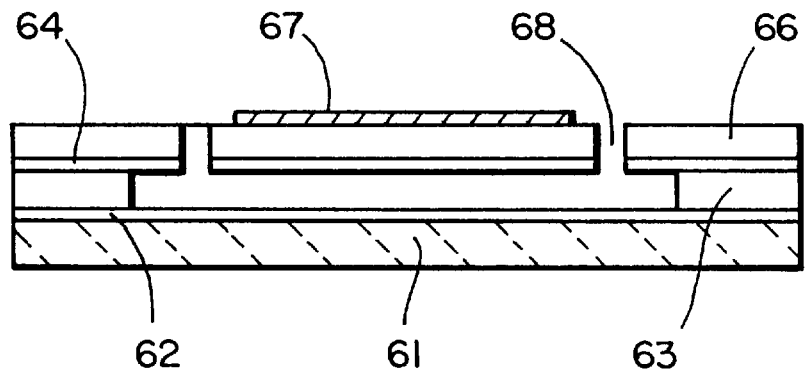
FIG_6B
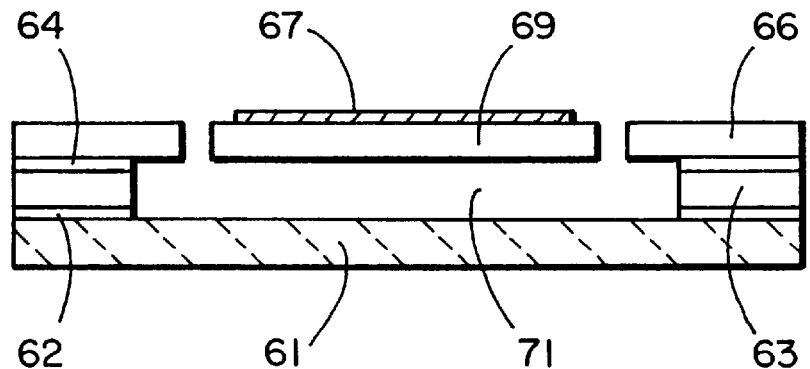
FIG_6C

METHOD OF MICROMACHINING A SCANNING TORSION MIRROR

This is a division of application Ser. No. 09/141,501 filed Aug. 28, 1998, pending, which claims priority to Provisional Application Ser. No. 60/062,675 filed on Oct. 22, 1997.

REFERENCE TO RELATED APPLICATIONS

The present application claims priority to Provisional Application Ser. No. 60/062,675 filed Oct. 22, 1997.

BRIEF DESCRIPTION OF THE INVENTION

This invention relates generally to a method of fabricating a scanning torsion mirror, and more particularly to a silicon nitride scanning mirror formed by patterning a low-stress silicon nitride layer which has been deposited on a substrate to define the mirror and hinges. The hinges Support the mirror within the silicon nitride layer. The substrate under the mirror is etched away to form a recess which permits the mirror to rotate about the hinges.

BACKGROUND OF THE INVENTION

Micromachined torsional beam scanners known in the art include a micromachined silicon mirror body supported within a silicon body by integral silicon torsion bars which permit the mirror to rotate within the silicon body about an axis through the torsion bars. The mirror body is electrostatically driven or rotated by applying voltages between electrodes on the mirror body and electrodes spaced adjacent the mirror body. The mirror can be used for digital imaging, optical scanning and writing systems, and magneto-optic recording and playback systems.

OBJECTS AND SUMMARY OF THE INVENTION

It is a general object of the present invention to provide an improved micromachined scanning torsion mirror.

It is another object of the present invention to provide a silicon nitride micromachined scanning torsion mirror.

It is a further object of the present invention to provide a method of fabricating a silicon nitride scanning torsion mirror employing semiconductor processing techniques.

It is a further object of the present invention to provide a silicon nitride scanning mirror which is torsionally supported by silicon nitride torsion bars above a well formed in a silicon substrate.

A silicon nitride mirror is supported within a silicon nitride layer by integral torsion bars. The silicon nitride layer is supported by a substrate which has a well beneath the mirror which permits the mirror to rotate about an axis through the integral torsion bars. A method of fabricating a silicon nitride scanning mirror which includes depositing a silicon nitride layer on a substrate by low-pressure chemical vapor deposition, patterning the layer to define a mirror body supported within the layer by integral torsion bars and, selectively etching the substrate to form a well below the mirror body.

BRIEF DESCRIPTION OF THE DRAWINGS

The foregoing and other objects of the invention will be more fully understood from the following description read in connection with the accompanying drawings, of which:

FIG. 1 is a top plan view of a micromachined scanning torsion mirror in accordance with the present invention.

FIG. 2 is a perspective sectional view of the scanning torsion mirror taken along the line 2—2 of FIG. 1.

FIGS. 3A–3H show the steps of forming the scanning torsion mirror shown in FIGS. 1 and 2.

FIG. 4 is a top plan view of a biaxial scanning torsion mirror in accordance with another embodiment of the present invention.

FIG. 5 is a sectional view of the scanning torsion mirror shown in FIG. 4 taken along the line 5—5 of FIG. 4.

FIGS. 6A—6C show the steps in forming a scanning torsion mirror in accordance with another embodiment of the present invention.

DESCRIPTION OF THE PREFERRED EMBODIMENT(S)

FIGS. 1 and 2 show a micromachined scanning torsion mirror in accordance with one embodiment of the present invention. The silicon nitride mirror body 11 is formed by etching an open frame 12 in a low-stress silicon nitride layer 13. The layer 13 may be deposited by low-pressure chemical vapor deposition onto a silicon oxide film 14 formed on a silicon substrate 16. The mirror is torsionally supported above a well 17 formed in the substrate 16 by integral torsion bars or hinges 18 formed or defined in the etching step. Reflecting electrodes 19 and 21 are carried by the mirror body, one on each side of the axis of rotation of the mirror body about the hinges 18. Leads 22 and 23 provide connections to electrodes 19 and 21. The substrate 16 may be conductive to form an electrode spaced from the electrodes 19 and 21 or a conductive film may be applied to the substrate. By applying voltages between the selected electrodes 19 or 21 and the common electrode, electrostatic forces are generated which cause the mirror to rotate about the hinges 18.

The steps of micromachining the mirror by semiconductor processes are now described with reference to FIGS. 3A–3H. A silicon wafer 16 (FIG. 3A) was oxidized to grow a silicon oxide film 14 (FIG. 3B). The silicon oxide layer was about 0.3 microns thick. A layer 13 of low-stress silicon nitride about 1.5 microns thick was deposited by low-pressure chemical vapor deposition (FIG. 2C). The silicon nitride layer was deposited from dichlorosilane and ammonia gases with a ratio of 5:2 at a temperature of 850° C. The oxide layer 14 separating the silicon from the silicon nitride served as a stress relief layer so that the stress in the silicon nitride layer 13 was uniform. An aluminum layer 26, 0.2 microns thick was sputtered onto the silicon nitride layer (FIG. 3D). The aluminum was lithographically patterned and etched to define the reflective electrodes 19 and 21 and the leads 22 and 23. Subsequently the silicon nitride layer and the silicon oxide layer were patterned and etched by reactive ion etching using a $CHF_3/O_2$ mixture (FIG. 3F) to form the open frame 12 and expose the underlying silicon substrate 16. The substrate under the mirror body 11 was then etched by xenon difluoride ($XeF_2$) to form the well 17. The silicon oxide served as an etch stop (FIG. 3G). The silicon oxide was then etched away by a hydrogen fluoride etch (FIG. 3H) to leave the scanning torsion mirror supported within the silicon nitride layer 13 as shown in FIGS. 1 and 2.

FIGS. 4 and 5 show a biaxial mirror formed by the same process. The biaxial mirror includes a silicon substrate 31 with a well 32. The biaxial mirrors are formed in a low-stress silicon nitride layer 33 by etching frame openings 34, 36. The frame opening 34 defines a rectangular mirror body 37. The frame openings 34, 36 define a rectangular frame 38.

The frame openings define hinges 41 which rotatably support the mirror body 37 within the rectangular frame 38 and hinges 42 rotatably support the frame 38 within the layer 33. The axes of rotation are perpendicular to one another. Spaced electrodes 47, 48 are formed on the mirror 37 and connection is made by leads 49, 51 which extend over the hinges 41 and 42. Spaced electrodes 52, 53 are formed on the frame 38 and connection is made through leads 54, 56 which extend over the hinge 42. The electrodes 47, 48 can serve as mirrors to deflect a light beam responsive to rotation of the mirror about the two axes.

FIG. 6 shows the fabrication of a scanning torsion mirror employing a commercially available SOI wafer. The SOI wafer comprises a silicon substrate 61, a silicon oxide layer 62, and an intrinsic silicon layer 63. A silicon oxide layer 64 is formed followed by deposition of a low-stress silicon nitride layer 66. The formation of electrodes 67 is not shown but would be as discussed above with reference to FIG. 3. A frame opening 68 is formed in the silicon nitride layer and the silicon oxide layer. The intrinsic silicon layer 63 is etched with the silicon oxide layers 62, 64 serving as etch stops (FIG. 6B). The silicon oxide layer is then etched to leave the mirror body 69 above the well 71.

The following is another method suitable for fabricating a silicon nitride scanning torsional mirror. A <100> cut silicon wafer is treated in the same way as described above with reference to FIG. 3. After the XeF$_2$ etching, a TMAH etching is carried out. Since the etch rate of the <111> plane is about 25 times slower than for the <100> plane, the etching will planarize silicon underneath the mirror. Aluminum is 100% compatible with this process. In order to use KOH instead of TMAH, Au/Cr would be used for the electrode metal. The last step is etching the stress relief silicon oxide layer 64 under the silicon nitride mirror body.

What is claimed:

1. The method of fabricating a silicon nitride mirror supported in a silicon nitride layer by torsion hinges comprising
    depositing a silicon oxide layer on a silicon member,
    depositing a low stress layer of silicon nitride on said oxide layer by low pressure chemical vapor deposition,
    sputtering an aluminum layer on the surface of the silicon nitride layer,
    lithographically patterning and etching said aluminum layer to form spaced reflective electrodes and leads,
    lithographically patterning and etching the silicon nitride layer and the silicon oxide layer to form an open frame exposing said silicon member, and to define a mirror having a mirror body,
    etching the silicon member under the mirror body to form a well beneath the mirror whereby the mirror is suspended by the silicon nitride layer by integral silicon nitride torsion hinges, and
    selectively etching the silicon oxide layer beneath the mirror.

2. A method as in claim 1 in which the member comprises an intrinsic silicon layer carried on a silicon oxide layer formed on a silicon layer or body.

3. The method of claim 1 in which the aluminum layer is etched and patterned to form first mirrors on a mirror body and second mirrors on a frame surrounding the mirror body and in which the silicon nitride layer and silicon oxide layer are etched to form first and second frames defining a mirror body within a mirror frame with orthogonal hinges whereby the silicon nitride mirror body is pivoted orthogonal to the silicon nitride frames.

* * * * *